United States Patent Office 3,576,013
Patented Apr. 20, 1971

3,576,013
POLYANHYDRIDES
William Cummings, Marford, Wales, assignor to Monsanto Chemicals Limited, London, England
No Drawing. Continuation-in-part of application Ser. No. 331,368, Dec. 18, 1963. This application Mar. 1, 1968, Ser. No. 709,805
Claims priority, application Great Britain, Dec. 28, 1962, 48,750/62; Mar. 16, 1967, 12,466/67
Int. Cl. C07c 63/48
U.S. Cl. 260—346.3                  6 Claims

ABSTRACT OF THE DISCLOSURE

This invention relates to new anhydride containing compositions and more particularly to mixtures of aromatic polyanhydrides and to processes for their preparation. The anhydrides of the present invention are characterized by having at least one anhydride group per molecule located on an aromatic nucleus, which aromatic nucleus is directly linked to at least one other aromatic nucleus by a direct nuclear carbon to nuclear carbon bond. These materials are of particular value as starting materials in the production of condensation polymers.

CROSS REFERENCES TO RELATED APPLICATIONS

This application is a continuation-in-part of U.S. patent application, Ser. No. 331,368, filed Dec. 18, 1963 and now abandoned, which in turn is a Convention application of British patent application No. 48,750/62, filed Dec. 28, 1962; now British Patent No. 976,611. This application claims the right to priority of British patent application No. 48,750/62, filed Dec. 28, 1962 and British patent application No. 12,466/67, filed Mar. 16, 1967.

BACKGROUND OF THE INVENTION (1) Field of the invention

This invention relates to novel anhydride compositions containing at least one anhydride group per molecule. More particularly this invention relates to novel polyaromatic nuclei compositions having at least two aromatic nuclei per molecule wherein at least one nuclei is characterized by having substituted thereon at least one anhydride group wherein the substituted aromatic nucleus is directly linked to at least one other aromatic nucleus by a direct nuclear carbon to nuclear carbon bond.

(2) Description of the prior art

Anhydrides containing at least one anhydride group per molecule are useful per se and as reactants used in the preparation of other substances. Dianhydrides are of special interest in polymer formation wherein the dianhydride is used as a monomeric reactant. Examples of the use of these dianhydrides in polymer formation may be found in U.S. Patents 2,900,369, 3,179,634, 3,182,073, 3,190,856, 3,277,117, 3,288,754 et al.

Some of the anhydrides taught in the above-cited patents and in other references are deficient for use in certain applications requiring prolonged exposure to high temperatures because of their aliphatic characteristics which are susceptible to thermal degradation at elevated temperatures. Other aromatic anhydrides are unsuitable in certain applications because of their limited functionality, i.e., having only one or two functional groups per molecule.

The present invention provides a solution to the aforementioned problems associated with aliphatic anhydrides and aromatic anhydrides having limited functionality.

SUMMARY OF THE INVENTION

It is an object of the present invention to provide new anhydride containing compositions.

It is further object of the present invention to provide novel mixtures of aromatic polyanhydrides.

It is a further object of the present invention to provide a process for obtaining the novel anhydrides and the novel mixtures of polyanhydrides.

The foregoing and other objects are obtained by new compositions of matter which comprise (1) Anhydrides characterized by having at least one anhydride group per molecule located on an aromatic nucleus which aromatic nucleus is directly linked to at least one other aromatic nucleus by a direct nuclear carbon to nuclear carbon bond, (2) Novel mixtures of polyanhydrides containing at least two anhydride groups per molecule wherein the anhydride groups are located on aromatic nuclei which aromatic nuclei are directly linked to at least one other aromatic nucleus by a direct nuclear carbon to nuclear carbon bond.

These anhydrides and polyanhydrides can be represented by the formula $P_aB_b$ where P represents a radical derived by the loss of one or more hydrogen atoms from the nucleus of the phthalic anhydride molecule, B represents a radical derived by the loss of two or more hydrogen atoms from the benzene molecule, and $a$ and $b$ are integers.

The anhydrides and mixtures of polyanhydrides are of value as chemical reagents and as starting materials in the production of other materials such as condensation polymers. The compositions of the present invention solve problems formerly associated with the prior art by providing anhydrides and mixtures thereof that are substantially free of aliphatic substituents and in some instances providing polyanhydrides with a functionality of greater than two (2).

DESCRIPTION OF THE PREFERRED EMBODIMENTS

As stated above, the anhydrides and mixtures of polyanhydrides of the present invention can be represented by the formula $P_aB_b$ where P represents a radical derived by the loss of one or more hydrogen atoms from the nucleus of the phthalic anhydride molecule, B represents a radical derived by the loss of two or more hydrogen atoms from the benzene molecule, and $a$ and $b$ are integers.

Mixtures of anhydrides in which the overall ratio of P units to B units varies over a wide range are included within the scope of the invention, but generally the most useful are those in which the ratio of P units to B units is from 1:2 to 2:1 and more especially from 1:1 to 2:1, for example from 1.1:1 to 1.9:1.

In many of the individual anhydrides, $a$ has a value which is 1 greater than the value of $b$, and in general, individual anhydrides of this type range from those containing two P units to one B unit, to those containing eleven P units to ten B units.

In the simplest instance of a mixture of polyanhydrides, the composition of the invention is a mixture of isomeric terphenyl tetracarboxylic dianhydrides having the formula:

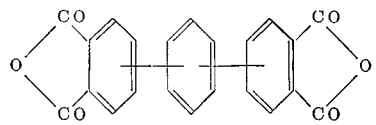

that is to say the ratio of $a$ to $b$ in each individual anhydride and in the mixture is 2:1. The terphenyl tetracarboxylic dianhydride where the two bonds from the middle benzene nucleus are located in the meta position relative to each other are the most readily obtainable by the process described below for the production of the anhydride compositions of the invention.

Many of the new compositions contain a proportion of terphenyl tetracarboxylic dianhydrides, but they also contain more complex bodies, for example those which can be represented by the formulae:

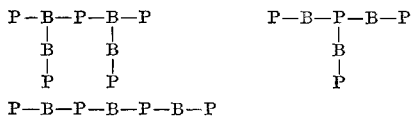

The compositions of the invention are obtained by a process in which a benzene sulphonyl halide is heated with a molar excess of phthalic anhydride under conditions such that sulphur dioxide and a hydrogen halide are evolved. Temperatures in the range of 200 to 450° C. are suitable, and in practice it is usually most convenient to boil the reaction mixture under reflux at atmospheric pressure, thus giving reaction temperatures which normally lie within the range 275 to 320° C. However, temperatures higher than 320° C. or higher than 350° C., for example up to 450° C., can be achieved by operating under pressure.

In a preferred procedure, the benzene sulphonyl halide is added gradually to the phthalic anhydride, and if necessary the reaction temperature is maintained for a period following the addition until the evolution of sulphur dioxide and hydrogen halide has practically ceased.

A variety of substances have a catalytic action on the process, among the most effective being copper and its compounds. The amount of catalyst used can vary from 0.001 to 0.5 gram mole (or gram atom) of catalyst per gram mole of benzene disulphonyl halide.

Benzene monosulphonyl halides are used to prepare the simplest monoanhydrides whereas benzene disulphonyl halides or benzene trisulphonyl halides are used to prepare the preferred mixtures of polyanhydrides. The preferred polyfunctional reactants are the benzene disulphonyl halides.

The benzene disulphonyl chlorides are the disulphonyl halides usually employed, although the disulphonyl bromides, for example are functionally equivalent. Of the various possible isomers, the meta disulphonyl halides are the most readily available, and hence are preferred for use in the present process.

Other specific examples of sulphonyl halides useful in the practice of the present invention include toluene sulphonyl chloride, t-butylbenzene sulphonyl chloride, p-phenylbenzene sulphonyl chloride, benzenesulphonyl bromide, m-benzenedisulphonyl chloride, p-benzenedisulphonyl chloride, 1,3,5-benzene trisulphonyl chloride, etc.

In the preferred embodiment, wherein the preferred mixture of polyanhydrides are prepared, the ratio of benzene disulphonyl halide to phthalic anhydride employed depends on the proportion of anhydride (P) units required in the product, but usually at least 1.5 moles of phthalic anhydride are used per mole of benzene disulphonyl halide. It is found that under normal process conditions, i.e. operating at atmospheric pressure at temperatures in the range 200 to 350° C., not all the phthalic anhydride is utilized, so that the ratio of anhydride to benzene disulphonyl halide in the reaction mixture should exceed the ratio of P units to B units required in the product. The exact ratio of reactants to be used to achieve a particular ratio of units in the product will depend on the particular reaction temperature and the presence or absence of a catalyst, but except for the production of a product consisting largely or exclusively of terphenyl dianhydrides it appears that generally the molar ratio of phthalic anhydride to benzene disulphonyl halide in the reaction mixture should be from approximately 1.5 to 5 times the ratio of corresponding units in the product. Within this range, the required excess increases as the ratio of P units to B units required in the product approaches 2:1. Where the required product consists largely or exclusively of terphenyl tetracarboxylic dianhydrides, it is possible, and in fact advantageous, to use a large excess of phthalic anhydride, for example 10 or 20 moles of phthalic anhydride per mole of benzene disulphonyl halide.

Thus, in general, there may be used, for example, from 2 to 20 moles of phthalic anhydride per mole of benzene disulphonyl halide, and particularly useful products are obtained when the molar ratio of phthalic anhydride to benzene disulphonyl halide is from 5:1 to 15:1. For most applications of the product, it is preferable to remove, for example by distillation, any unchanged phthalic anhydride from the reaction mixture.

The invention is illustrated by the following examples.

Example 1.—A mixture of 90 grams (0.61 mole) of phthalic anhydride and 0.01 gram of copper is heated to boiling point in a reaction vessel equipped with a stirrer, reflux condenser, heated dropping funnel and an inlet for gas. A slow stream of nitrogen is led into the vessel above the surface of the liquid, and 75 grams (0.272 mole) of m-benzenedisulphonyl chloride are added dropwise with stirring over a period of 6 hours 40 minutes, during which time the temperature rises from 254° C. to 304° C. Sulphur dioxide and hydrogen chloride are evolved and are led in the entraining stream of nitrogen into a scrubber containing sodium hydroxide solution. Analysis of the contents of the scrubber for chloride and sulphite at the end of the reaction shows that 95.4% of the theoretical amount of hydrogen chloride and 94.0% of the theoretical amount of sulphur dioxide has been evolved.

The reaction product is subjected to distillation at a pressure of 20 to 25 mm. of mercury. There are thus recovered 41 grams of phthalic anhydride leaving a residue of 69 grams of polyphenylene polyanhydrides. From the amount of recovered phthalic anhydride it is calculated that the polyphenylene polyanhydrides contain an overall molar ratio of P units to B units of 1.21:1.

Example 2.—This example describes the production of a mixture of isomeric terphenyl dianhydrides.

Using the apparatus described in Example 1, 46 grams (0.167 mole) of m-benzenedisulphonyl chloride are added with stirring to a refluxing suspension of 0.04 gram of copper in 300 grams (2.03 moles) of phthalic anhydride over a period of 6 hours 40 minutes, during which time the liquid temperature rises from 286° C. to 293° C. The sulphur dioxide and hydrogen chloride evolved are equivalent respectively to 96.4% and 98.6% of the theoretical quantities.

By distillation of the product at a pressure of 25 mm. of mercury, 255.5 grams of phthalic anhydride are recovered, leaving 56 grams of a residue consisting essentially of terphenyl tetracarboxylic dianhydride isomers.

Example 3.—This example describes the production of a polyphenylene polyanhydride mixture having a higher overall ratio of P units than that described in Example 1.

Using the apparatus described in Example 1, 30 grams (0.29 mole) of m-benzenedisulphonyl chloride are added dropwise to a stirred, refluxing suspension of 0.055 gram of copper in 215 grams (1.45 moles) of phthalic anhydride over a period of 6 hours 40 minutes. During this time the liquid temperature rises from 284° C. to 298° C., and 97.3% of the theoretical quantity of hydrogen chloride and 96.0% of the theoretical quantity of sulphur dioxide are evolved.

147 grams of unreacted phthalic anhydride are then recovered by distillation under reduced pressure, leaving 87.5 grams of polyphenyl polyanhydrides as residue. From the amount of phthalic anhydride that has reacted with the benzene disulphonyl chloride, it is calculated that the overall ratio of P units to B units in the product is 1.745:1.

Example 4.—3,552 grams (24 moles) of phthalic anhydride are heated, with stirring, to reflux in the presence of 12 grams of copper and under a gentle stream of nitrogen. 1,000 grams (4 moles) of m-benzenedisulphonyl chloride, held at 65° C., are then added dropwise to the stirred, refluxing liquid at a uniform rate over a period of 500 mins., the pot temperature rising during this time from 289 to 298° C. The reaction mixture is refluxed for a further 30 minutes after the addition is complete.

98% of the theoretical quantity of sulphur dioxide and 100% of the theoretical quantity of hydrogen chloride are produced during the reaction, and are absorbed out of the nitrogen stream by 12.5% wt./vol. sodium hydroxide solution.

2,677 grams of unreacted phthalic anhydride are recovered by distilling the reaction mixture at 25 mm. pressure and taking the pot temperature up to 300° C., leaving a residue weighing 1,240 grams. This is completely soluble in chloroform, in which its molecular weight is determined to be 573. The equivalent weight of the product is found by titration against standard alkali to be 102, equivalent to the product containing 72.5% by weight of phthalic anhydride units compared with 79.7% by weight of phthalic anhydride units calculated for terphenyl tetracarboxylic dianhydride. The melting point of the product is 130 to 165° C.

Example 5.—3,552 grams (24 moles) of phthalic anhydride are heated, with stirring, to reflux in the presence of 12 grams of copper, and under a gentle stream of nitrogen. 550 grams (2 moles) of m-benzenedisulphonyl chloride held at 65° C., are then added dropwise to the stirred refluxing liquid at a uniform rate over a period of 420 minutes, the pot temperature rising during this time from 290 to 297° C. The reaction mixture is refluxed for a further 30 minutes after the addition is complete.

94.2% of the theoretical quantity of sulphur dioxide and 98.4% of theoretical quantity of hydrogen chloride were produced during the reaction and were absorbed out of the nitrogen stream by 12.5% wt./vol. sodium hydroxide solution.

2,984 grams of unreacted phthalic anhydride are recovered by distilling the reaction mixture of 25 mm. pressure and taking the pot temperature up to 300° C., leaving a residue weighing 686 grams. This residue is completely soluble in chloroform, in which its molecular weight was found to be 520. The equivalent weight of the product is determined by titration against standard alkali and found to be 98.1, equivalent to the product containing 75.45% of phthalic anhydride. Its melting point is 121 to 130.5° C.

Example 6.—This example described the production of phenylphthalic anhydride by the reaction of phthalic anhydride with benzenesulphonyl chloride.

A mixture of 17.7 grams (0.1 mole) of benzenesulphonyl chloride, 222 grams (1.5 moles) of phthalic anhydride and 0.1 gram (0.001 mole) of cuprous chloride is heated to 249 to 253° C. under reflux. Hydrogen chloride and sulphur dioxide are produced; these are entrained in a slow stream of nitrogen bubbled through the reaction mixture and absorbed in a trap containing sodium hydroxide solution. After 3 hours, 71% of the theoretical amount of hydrogen chloride and 70% of the theoretical amount of sulphur dioxide has been evolved, and no further evolution of these gases occurs during the subsequent heating which is continued for 6 hours.

Excess phthalic anhydride is distilled from the reaction mixture under reduced pressure. Distillation of the residue gives, as a main fraction, 11.2 grams of crude phenylphthalic anhydrides having a boiling range of 160 to 180° C. at a pressure of 0.25 mm of mercury, and containing a trace of benzenesulphonic acid. The product is purified by dissolving in benzene and washing the benzene solution with water. Nine and six-tenths grams of phenylphthalic anhydrides, having an infrared spectrum consistent with the presence of both the 1- and 2-isomers, are recovered by evaporation of the benzene.

In view of the foregoing it will be apparent that many deviations may be made from the teachings set forth above without departing from the spirit and scope of the invention.

What is claimed is:

1. A mixture of aromatic polyanhydrides prepared by a process which comprises:
   (1) heating a mixture of benzene disulphonyl halide and phthalic anhydride at a temperature in the range of from 200° C. to 450° C. with the evolution of sulphur dioxide and hydrogen halide; and
   (2) removing any unreacted phthalic anhydride from the reaction mixture; wherein the benzene disulphonyl halide is selected from the group consisting of m-benzenedisulphonyl chloride, p-benzenedisulphonyl chloride, m-benzenedisulphonyl bromide, and p-benzenedisulphonyl bromide; and wherein at least 1.5 moles of phthalic anhydride are used for each mole of benzenedisulphonyl halide.

2. A mixture of aromatic polyanhydrides as in claim 1 wherein the reaction is carried out at a temperature in the range of from 275° C. to 450° C.

3. A mixture of aromatic polyanhydrides as in claim 1 wherein from 2 to 20 moles of phthalic anhydride are used for each mole of benzene disulphonyl halide.

4. A mixture of aromatic polyanhydrides as in claim 1 wherein the molar ratio of phthalic anhydride to benzene disulphonyl halide is from 5:1 to 15:1.

5. A mixture of aromatic polyanhydrides prepared by a process which comprises:
   (1) heating a mixture of meta- or para-benzene disulphonyl chloride and phthalic anhydride at a temperature in the range of from 275° C. to 450° C. with the evolution of sulphur dioxide and hydrogen chloride; and
   (2) removing any unreacted phthalic anhydride from the reaction mixture; and wherein from 2 to 20 moles of phthalic anhydride are used for each mole of benzene disulphonyl chloride.

6. A mixture of aromatic polyanhydrides as in claim 5 wherein the molar ratio of phthalic anhydride to benzene disulphonyl halide is from 5:1 to 15:1.

References Cited
UNITED STATES PATENTS

| | | | |
|---|---|---|---|
| 2,859,251 | 11/1958 | Linn | 260—546 |
| 3,231,629 | 1/1966 | McCall et al. | 260—670 |

ALEX MAZEL, Primary Examiner

B. J. DENTZ, Assistant Examiner

U.S. Cl. X.R.

260—47, 75, 78